United States Patent
Prostko et al.

(10) Patent No.: US 10,355,723 B2
(45) Date of Patent: *Jul. 16, 2019

(54) COMMUNICATION CIRCUIT WITH SINGLE ELEMENT ANTENNA FOR MULTI-FREQUENCY APPLICATIONS

(71) Applicant: Schlage Lock Company LLC, Carmel, IN (US)

(72) Inventors: Robert Prostko, Carmel, IN (US); Ryan C. Kincaid, Indianapolis, IN (US); Brian A. Telljohann, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,802

(22) Filed: Nov. 28, 2017

(65) Prior Publication Data

US 2019/0165819 A1    May 30, 2019

(51) Int. Cl.
| | | |
|---|---|---|
| *H04B 1/00* | (2006.01) |
| *G06K 19/00* | (2006.01) |
| *H04B 1/401* | (2015.01) |
| *G06K 7/10* | (2006.01) |
| *G07C 9/00* | (2006.01) |
| *H04B 5/00* | (2006.01) |
| *G06K 19/077* | (2006.01) |

(Continued)

(52) U.S. Cl.
CPC ......... *H04B 1/006* (2013.01); *G06K 7/10158* (2013.01); *G06K 7/10316* (2013.01); *G06K 19/0709* (2013.01); *G06K 19/07773* (2013.01); *G07C 9/00015* (2013.01); *H04B 1/401* (2013.01); *H04B 5/0037* (2013.01); *H01Q 1/2216* (2013.01)

(58) Field of Classification Search
CPC ...... H04B 1/006; H04B 1/401; H04B 5/0037; H04B 1/48; G06K 7/10316; G06K 19/07767; G07C 9/00015

See application file for complete search history.

(56) References Cited

U.S. PATENT DOCUMENTS

| | | |
|---|---|---|
| 4,679,046 A | 7/1987 | Curtis et al. |
| 5,170,493 A | 12/1992 | Roth |

(Continued)

OTHER PUBLICATIONS

International Search Report; International Searching Authority; International Patent Application No. PCT/US2018/062806; dated Feb. 8, 2019; 2 pages.

(Continued)

*Primary Examiner* — Thomas D Alunkal
(74) *Attorney, Agent, or Firm* — Taft Stettinius & Hollister LLP (57) ABSTRACT

A communication circuit according to one embodiment includes a single element antenna, a plurality of signal-limiting circuits, a high-frequency transceiver circuit, and a low-frequency transceiver circuit. The high-frequency transceiver circuit is adapted to be selectively coupled to the single element antenna via the plurality of signal-limiting circuits and tuned to operate at a high frequency carrier frequency, and the low-frequency transceiver circuit is adapted to be selectively coupled to the single element antenna via the plurality of signal-limiting circuits and tuned to operate at a low frequency carrier frequency.

11 Claims, 10 Drawing Sheets

(51) Int. Cl.
    *G06K 19/07*    (2006.01)
    *H01Q 1/22*    (2006.01)

(56) References Cited

U.S. PATENT DOCUMENTS

| | | | | |
|---|---|---|---|---|
| 6,911,876 B2* | 6/2005 | Grabner | ............... | G06K 7/0008 |
| | | | | 333/101 |
| 7,295,162 B2 | 11/2007 | Wang et al. | | |
| 7,439,862 B2 | 10/2008 | Quan | | |
| 9,667,279 B2* | 5/2017 | Pavacic | ............... | H04B 1/0064 |
| 2003/0040282 A1* | 2/2003 | Park | .................... | H04B 1/0092 |
| | | | | 455/67.11 |
| 2005/0052283 A1* | 3/2005 | Collins | ............ | G06K 19/07767 |
| | | | | 340/572.7 |
| 2005/0258966 A1 | 11/2005 | Quan | | |
| 2006/0141944 A1* | 6/2006 | Shibagaki | ............... | H04B 1/006 |
| | | | | 455/78 |
| 2007/0075803 A1* | 4/2007 | Kemmochi | .......... | H04B 1/0057 |
| | | | | 333/132 |
| 2012/0062358 A1* | 3/2012 | Nowottnick | ..... | G06K 19/07767 |
| | | | | 340/5.2 |
| 2013/0341414 A1 | 12/2013 | Ziller et al. | | |
| 2014/0117927 A1* | 5/2014 | Chateau | ............... | H04B 5/0075 |
| | | | | 320/108 |
| 2014/0307599 A1* | 10/2014 | Rousu | .................... | H04B 1/006 |
| | | | | 370/297 |
| 2015/0090789 A1 | 4/2015 | Kastner et al. | | |
| 2016/0294058 A1 | 10/2016 | Tunnell et al. | | |
| 2016/0365878 A1* | 12/2016 | Balm | ..................... | H04B 1/006 |
| 2017/0040695 A1* | 2/2017 | Rajagopalan | ........... | H02J 7/025 |
| 2017/0237292 A1* | 8/2017 | Jeong | ..................... | H02J 50/80 |
| | | | | 307/104 |

OTHER PUBLICATIONS

Written Opinion; International Searching Authority; International Patent Application No. PCT/US2018/062806; dated Feb. 8, 2019; 6 pages.

* cited by examiner

COMMUNICATION CIRCUIT WITH SINGLE ELEMENT ANTENNA FOR MULTI-FREQUENCY APPLICATIONS

BACKGROUND

A reader is a device that can be used to communicate with credential devices (e.g., cards, fobs, tags, phones, etc.) in access control systems, credential systems, and other systems. The reader may read data from the credential and the reader may write data to the credential.

Generally, the credential device is an active or passive radio frequency (RF) communication device that can wirelessly communicate with various devices in the system (e.g., readers, access control devices, etc.). Passive credential devices rely on another device to supply power to the passive credential device by virtue of an excitation signal, whereas active credential devices supply their own power. Common passive credential devices include proximity cards, which communicate via data signals transmitted at a nominal carrier frequency of 125 kHz, and smartcards, which communicate via data signals transmitted at a nominal carrier frequency of 13.56 MHz.

SUMMARY

One embodiment is a unique system, components, and methods for a single element antenna. Other embodiments include apparatuses, systems, devices, hardware, methods, and combinations for a single element antenna. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a foam readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
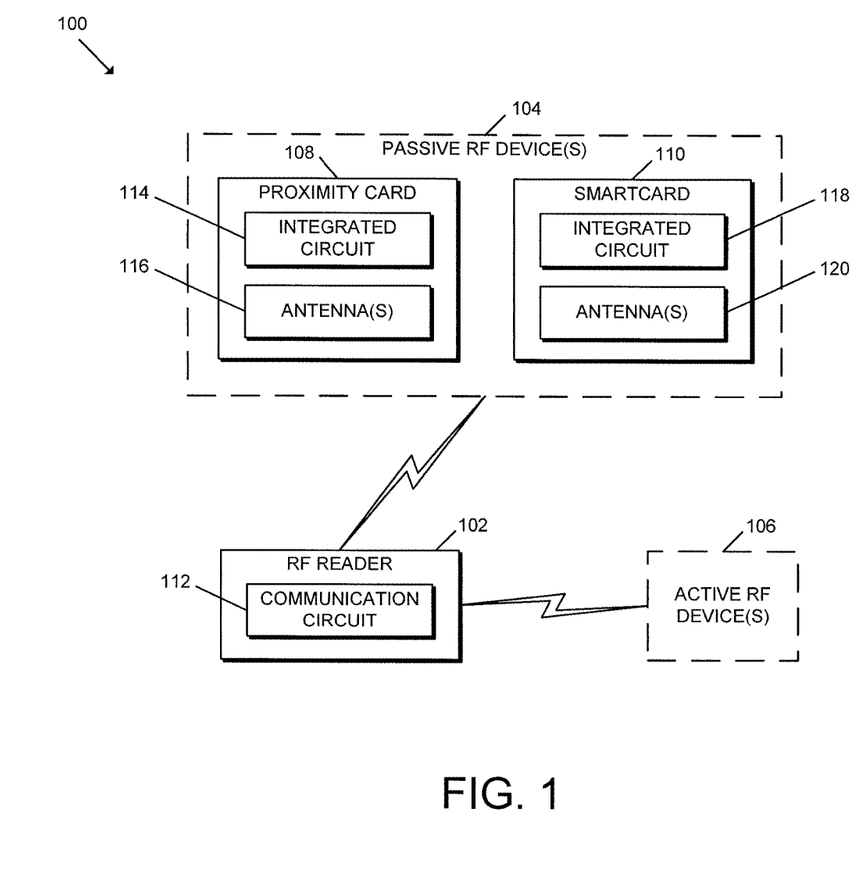
FIG. 1 is a simplified block diagram of at least one embodiment of a system for multi-frequency communication.

Referring now to FIG. 1, in the illustrative embodiment, a system 100 for multi-frequency communication includes a radio frequency (RF) reader 102 and one or more passive RF devices 104. Additionally, in some embodiments, the system 100 may include one or more active RF devices 106. In particular, the illustrative passive RF devices 104 include a proximity card 108 and a smartcard 110; however, it should be appreciated that the system 100 may include additional and/or alternative passive RF devices 104 in other embodiments. As described in detail below, the RF reader 102 includes a communication circuit 112 having a single element antenna 302 that enables communication with RF-capable devices over multiple different carrier frequencies. For example, in the illustrative embodiment, the RF reader 102 is capable of wirelessly communicating with the proximity card 108 using the single element antenna 302 via RF signals at a nominal carrier frequency of 125 kHz (e.g., within the range of approximately 100-150 kHz) and wirelessly communicating with the smartcard 110 using the single element antenna 302 via RF signals at a nominal carrier frequency of 13.56 MHz.

A single element antenna is one continuous conductor without interference (or minimal interference) from other components such as, but not limited to, passive components, integrated circuits (ICs), or switches. The one continuous conductor may include a stub or resonant stub. Furthermore, the one continuous conductor may include one or more conducting mediums such as a copper wire and/or a printed circuit board (PCB) trace, and may include different gauges of wire or trace widths.

It should be appreciated that the RF reader 102 may be embodied as any device suitable for including the communication circuit 112 for wireless RF communication with other devices (e.g., passive RF devices 104 and/or active RF devices 106) based on the techniques and mechanisms described herein. For example, in some embodiments, the RF reader 102 may be embodied as an enrollment reader, reader/writer device, access control device, kiosk, and/or other suitable device. In embodiments in which the RF reader 102 is embodied as an access control device, the access control device may be configured to control access through one or more corresponding passageways (e.g., via a lock mechanism such as a deadbolt, latch bolt, lever, and/or other mechanism adapted to move between a locked and unlocked state). However, it should be appreciated that the access control device may be embodied as another type of access control device in other embodiments. In some embodiments, the RF reader 102 may be embodied as one or more computing devices similar to the computing device 200 described below in reference to FIG. 2. For example, in the illustrative embodiment, the RF reader 102 includes a processing device 202 and a memory 206 having stored thereon operating logic 208 for execution by the processing device 202 for operation of the RF reader 102. Further, in embodiments including an active RF device, the active RF device may be embodied as a computing device similar to the computing device 200 of FIG. 2.

Figure 2:
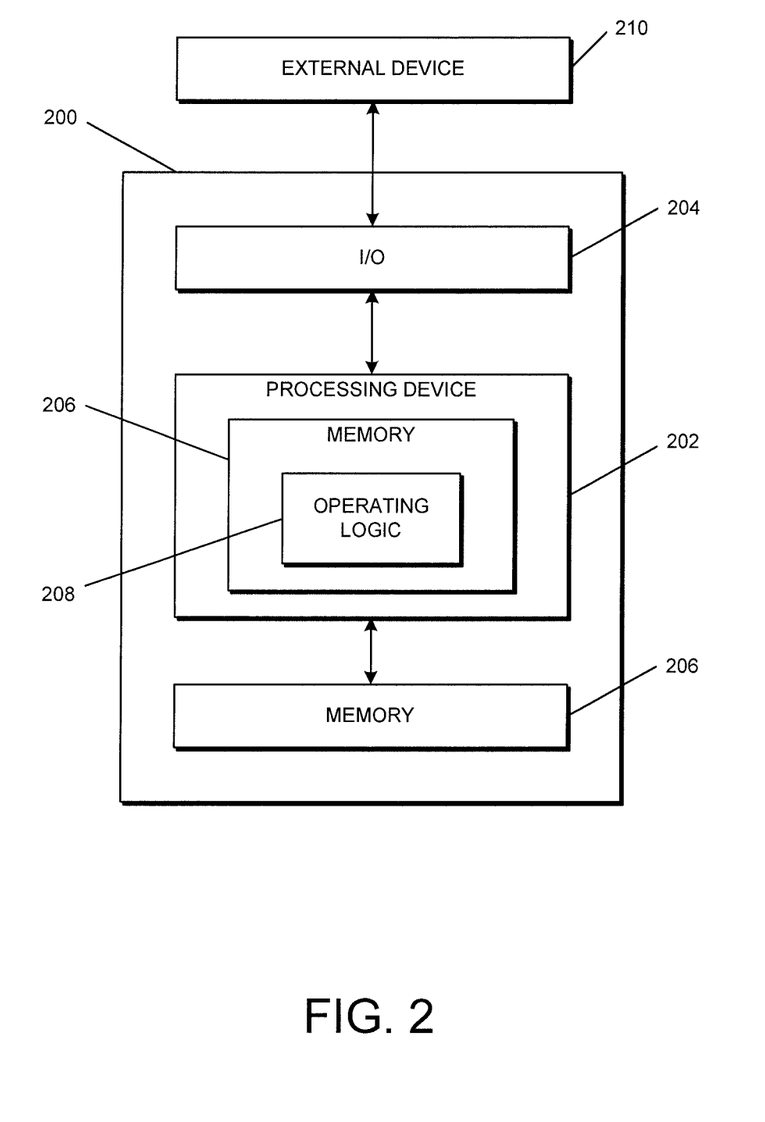
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a RF reader that may be utilized in connection with the RF reader 102 illustrated in FIG. 1. Depending on the particular embodiment, the computing device 200 may be embodied as a reader device, enrollment device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the RF reader 102, one or more of the passive RF devices 104, and/or one or more of the active RF devices 106. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Referring back to FIG. 1, it should further be appreciated that the illustrative RF reader 102 includes the communication circuit 112. As indicated above, the communication circuit 112 of the RF reader 102 includes the single element antenna 302 and enables communication with RF-capable devices over multiple different carrier frequencies. In some embodiments, the communication circuit 112 may be embodied as (or include the entirety or a portion of) the communication circuit 300 of FIGS. 3-5, the communication circuit 1000 of FIG. 10, or the communication circuit 1100 of FIG. 11.

The active RF device(s) 106 may be embodied as any non-passive device capable of communicating with the RF reader 102 via RF signals (e.g., a self-powered RF communication device) and otherwise performing the functions described herein. For example, each of the active RF device(s) 106 may be embodied as a computing device similar to the computing device 200 described above in reference to FIG. 2. In particular, in some embodiments, one or more of the active RF device(s) 106 may be embodied as a mobile computing device such as a laptop computer, tablet computer, notebook, netbook, Ultrabook™ cellular phone, smartphone, wearable computing device, personal digital assistant, Internet of Things (IoT) device and/or another mobile computing device capable of performing the functions described herein.

As indicated above, the proximity card 108 is a passive RF device capable of wirelessly communicating with the RF reader 102 at a nominal carrier frequency of 125 kHz. As such, in the illustrative embodiment, the proximity card 108 is not physically coupled to a power supply; instead, the proximity card 108 is powered by virtue of electromagnetic waves (i.e., excitation signals) transmitted by the RF reader 102 when the RF reader 102 is within a certain range of the proximity card 108. As shown in FIG. 1, the illustrative proximity card 108 includes an integrated circuit 114 electrically coupled to one or more antennas 116. Although the proximity card 108 may include additional and/or alternative components, those components are omitted herein for clarity of the description. When the RF reader 102 is within a sufficient distance of the proximity card 108, the integrated circuit 114 is powered by virtue of excitation signals received by the proximity card 108. The integrated circuit 114 includes a memory including various instructions and data (e.g., one or more unique identifiers associated with the proximity card 108 or user thereof) and a processor that, when powered, is capable of processing the instructions stored on the memory, for example, to read data from the memory, write data to the memory, and/or communicate with the RF reader 102 via the antenna(s) 116.

The smartcard 110 is a passive RF device capable of wirelessly communicating with the RF reader 102 at a nominal frequency of 13.56 MHz. Similar to the proximity card 108, the smartcard 110 is not physically coupled to a power supply and, therefore, must be powered by virtue of electromagnetic waves transmitted by the RF reader 102 when the RF reader 102 is within a sufficient distance to provide such excitation signals. Additionally, the illustrative smartcard 110 includes an integrated circuit 118 that is electrically coupled to one or more antennas 120. In some embodiments, the integrated circuit 118 and the antenna(s) 120 of the smartcard 110 may be similar to the integrated circuit 114 and the antenna(s) 116 of the proximity card 108. As such, the description of the integrated circuit 114 and the antenna(s) 116 is equally applicable to the corresponding components of the smartcard 110 and has not been repeated herein for clarity of the description. In some embodiments, it should be appreciated that the smartcard 110 may include additional functionality relative to the proximity card 108. For example, in some embodiments, after the initial provisioning of the proximity card 108, the proximity card 108 may provide read-only access to the data stored thereon, whereas the smartcard 110 may provide read-write access to the data stored thereon. Additionally, although the proximity card 108 and the smartcard 110 are described herein as "cards," it should be appreciated that the proximity card 108 and/or the smartcard 110 may be in any physical form suitable for performing the functions described herein. For example, in various embodiments, the proximity card 108 and/or the smartcard 110 may be embodied as a tag, fob, pin, or other suitable device. In some embodiments, the card 108, 110 may be integrated into another physical device/mechanism.

Although only one RF reader 102, one active RF device 106, one proximity card 108, and one smartcard 110 are shown in the illustrative embodiment of FIG. 1, the system 100 may include multiple RF readers 102, active RF devices 106, proximity cards 108, and/or smartcards 110 in other embodiments. For example, a particular RF reader 102 may be configured to communicate with myriad other RF devices 104, 106. Further, it should be appreciated that, in various embodiments, the system 100 may include any number and type of passive RF devices 104.

Figure 3:
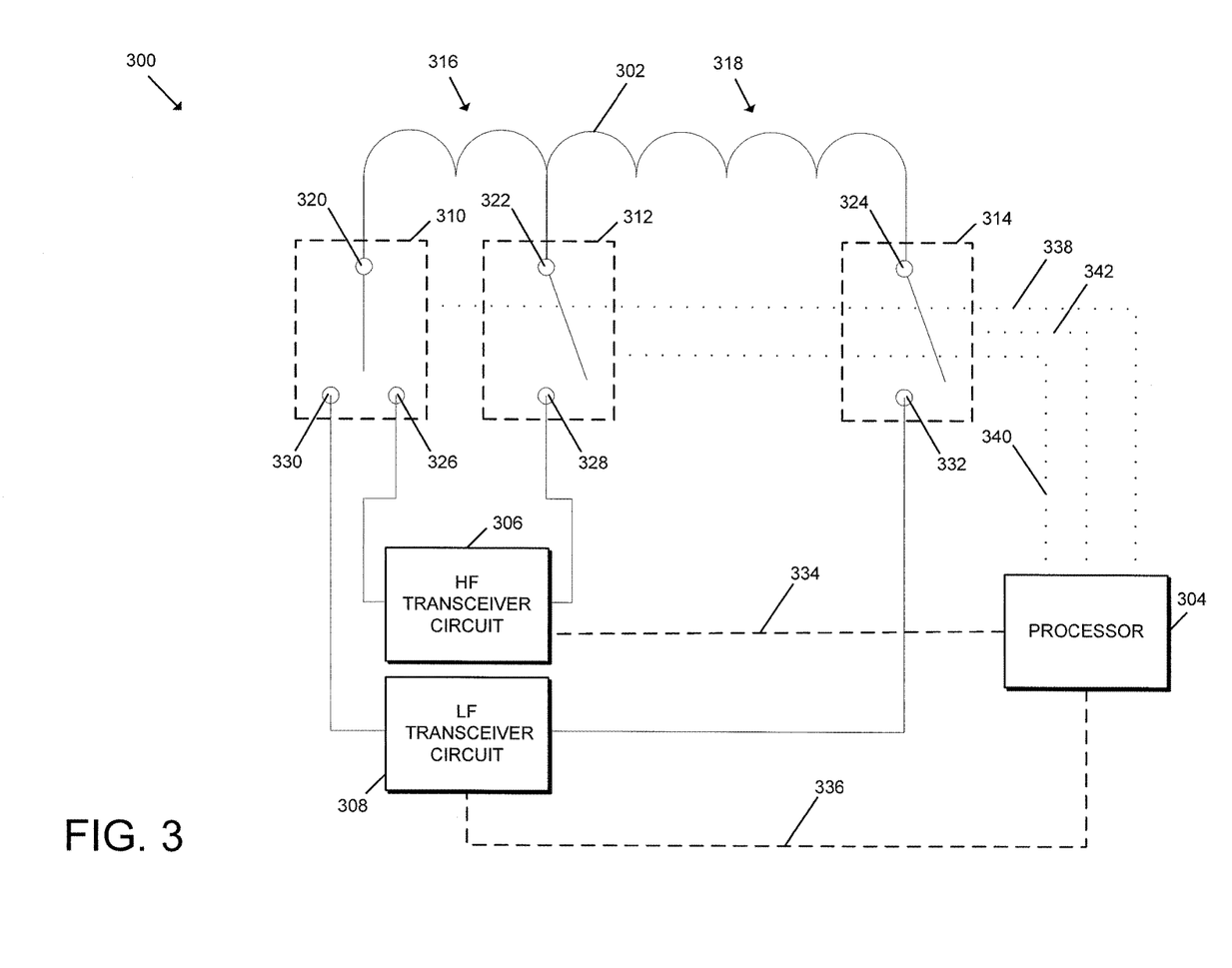
FIGS. 3-5 are simplified diagrams of at least one embodiment of the communication circuit of FIG. 1.
Figure 4:
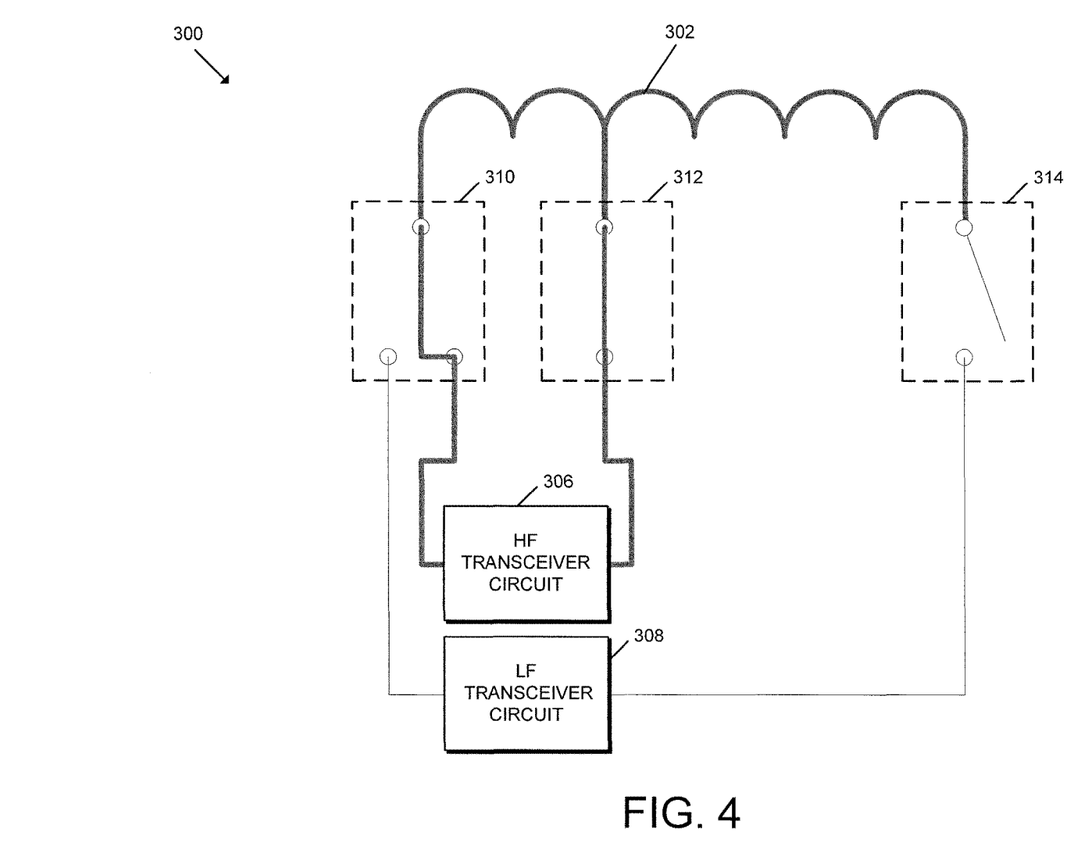
Figure 5:
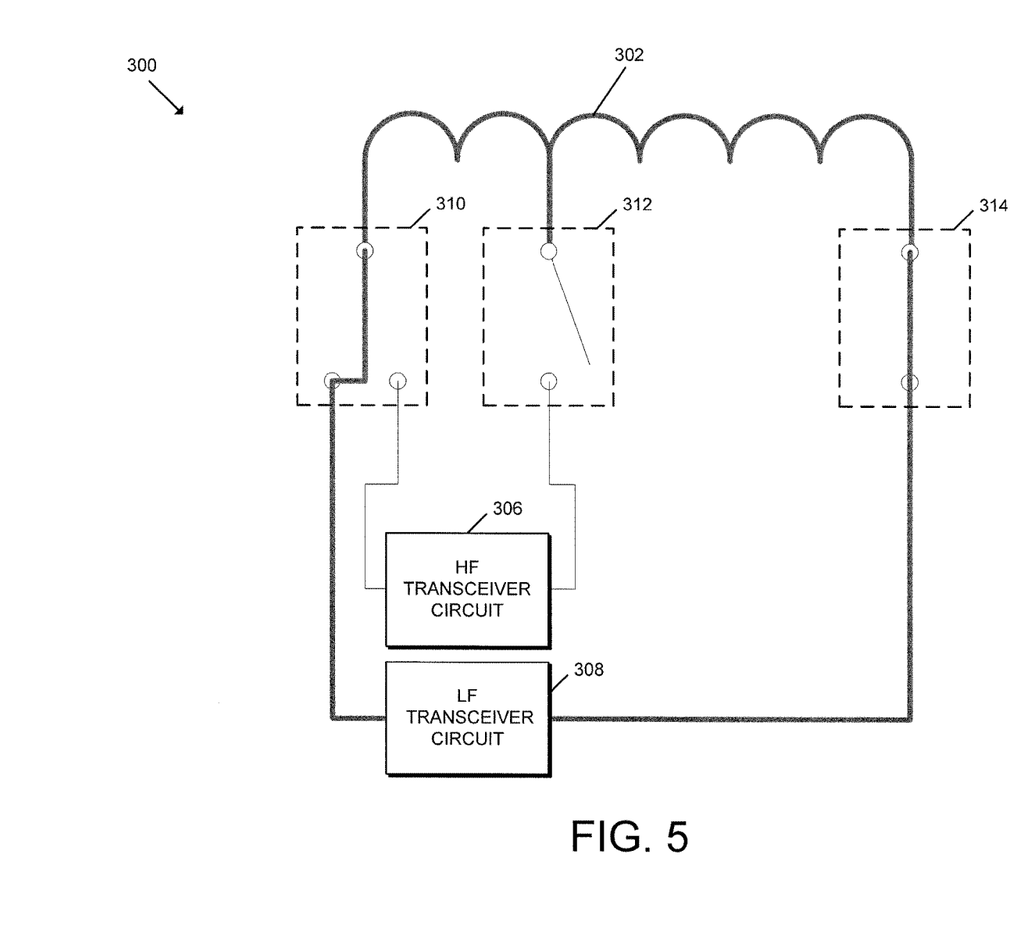

In some embodiments, it should be appreciated that the communication circuit 112 of the RF reader 102 may be embodied as the communication circuit 300 illustrated in FIGS. 3-5. Referring now to FIGS. 3-5, the illustrative communication circuit 300 includes a single element antenna 302, a processor 304, a high-frequency (HF) transceiver circuit 306, and a low-frequency (LF) transceiver circuit 308. As described herein, the high-frequency transceiver circuit 306 enables wireless communication with RF devices 104, 106 over a high frequency carrier frequency. In particular, in the illustrative embodiment, the high-frequency transceiver circuit 306 enables wireless RF communication with the smartcard 110 over a high frequency carrier frequency that is nominally 13.56 MHz. Further, the low-frequency transceiver circuit 308 enables wireless communication with RF devices 104, 106 over a low frequency carrier frequency. In particular, in the illustrative embodiment, the low-frequency transceiver circuit 308 enables wireless RF communication with the proximity card 108 over a low frequency carrier frequency that is nominally 125 kHz.

The illustrative communication circuit 300 further includes signal-limiting circuits 310, 312, 314. Although the signal-limiting circuits 310, 312, 314 of the communication circuit 300 are depicted as switches, it should be appreciated that one or more of the signal-limiting circuits 310, 312, 314 may be embodied as another type of signal-limiting circuit. For example, in various embodiments, the signal-limiting circuits 310, 312, 314 may be embodied as electrical switches, electromechanical switches, solid state switches, electromechanical relays, solid state relays, transistors, active filters, passive filters (e.g., circuits including resistors, capacitors, and/or inductors), and/or other signal-limiting circuits capable of performing the functions described herein.

In the illustrative embodiment, it should be appreciated that the single element antenna 302 is embodied as a single continuous conductor having two portions 316, 318. The first portion 316 is defined between a first node 320 and a second node 322, and the second portion 318 is defined between the second node 322 and a third node 324. As shown, the illustrative high-frequency transceiver circuit 306 has electrical terminals 326, 328, and the low-frequency transceiver circuit 308 has electrical terminals 330, 332. Further, in the illustrative embodiment, the signal-limiting circuit 310 is coupled to the first node 320 and the terminals 326, 330; the signal-limiting circuit 312 is coupled to the second node 322 and the terminal 328; and the signal-limiting circuit 314 is coupled to the third node 324 and the terminal 332. More specifically, in some embodiments, the signal-limiting circuit 310 may be "switched" between a state in which the first node 320 is electrically coupled to the terminal 326 and a state in which the first node 320 is electrically coupled to the terminal 330. Further, in some embodiments, the signal-limiting circuit 312 may be "switched" between a state in which the second node 322 is decoupled from the terminal 328 (e.g., an open state) and a state in which the second node 322 is electrically coupled to the terminal 328 (e.g., a closed state). Additionally, in some embodiments, the signal-limiting circuit 314 may be "switched" between a state in which the third node 324 is decoupled from the terminal 332 (e.g., an open state) and a state in which the third node 324 is electrically coupled to the terminal 332 (e.g., a closed state).

As shown, the illustrative communication circuit 300 further includes the processor 304, which is communicatively coupled to the high-frequency transceiver circuit 306, the low-frequency transceiver circuit 308, and the signal-limiting circuits 310, 312, 314 for control thereof. In particular, the processor 304 is communicatively coupled to the high-frequency transceiver circuit 306 via an electrical connection 334 and is communicatively coupled to the low-frequency transceiver circuit 308 via an electrical connection 336. Additionally, the processor 304 is communicatively coupled to the signal-limiting circuits 310, 312, 314 via electrical connections 338, 340, 342, respectively. It should be appreciated that the electrical connections 334, 336, 338, 340, 342 may be embodied as any type of electrical connections that allow the processor 304 to communicate with the corresponding circuits and otherwise perform the functions described herein. For example, in some embodiments, the electrical connections 334, 336 may be embodied as digital control connections that allow the processor 304 to interact with the high-frequency transceiver circuit 306 and the low-frequency transceiver circuit 308 via a SPI interface. Further, in some embodiments, the electrical connections 338, 340, 342 may be embodied as general purpose input/output (GPIO) connections that allow the processor 304 to interact with the signal-limiting circuits 310, 312, 314 (e.g., electrical switches).

It should be appreciated that the processor 304 may be embodied as any processor or processing device suitable for performing the functions described herein. For example, in some embodiments, the processor 304 may be embodied as a processing device similar to the processing device 202 described above in reference to FIG. 2. In particular, the processor 304 may be embodied as, or otherwise include, a microprocessor, microcontroller, arithmetic logic unit, central processing unit, digital signal processor, and/or other suitable processor. The processor 304 and the connections 334, 336, 338, 340, 342 have been omitted from FIGS. 4-5 for clarity of the description.

As shown in reference to FIGS. 3-5, the illustrative processor 304 is configured to control the signal-limiting circuits 310, 312, 314 to selectively couple the high-frequency transceiver circuit 306 and the low-frequency transceiver circuit 308 to the single element antenna 302 for communication with remote devices via the corresponding carrier frequency. As shown in FIG. 4, in a first mode of operation, the processor 304 controls the signal-limiting circuits 310, 312, 314 to electrically couple/connect the high-frequency transceiver circuit 306 to the single element antenna 302 and decouple/disconnect the low-frequency transceiver circuit 308 from the single element antenna 302. Accordingly, in the first mode of operation, the processor 304 is configured to power and received data from RF devices 104, 106 (e.g., the smartcard 110) over the high frequency carrier frequency (e.g., 13.56 MHz). In the first mode of operation in which the high-frequency transceiver circuit 306 is electrically coupled to the single element antenna 302 for communication over the high frequency carrier frequency, it should be appreciated that the portion 318 of the single element antenna 302 exhibits one or more electromagnetic characteristics of a resonant stub (i.e., the portion 318 acts as a passive RF component/element), which are filtered by the high-frequency transceiver circuit 306. As shown in FIG. 5, in a second mode of operation, the processor 304 controls the signal-limiting circuits 310, 312, 314 to electrically couple/connect the low-frequency transceiver circuit 308 to the single element antenna 302 and decouple/disconnect the high-frequency transceiver circuit 306 from the single element antenna 302. Accordingly, in the second mode of operation, the processor 304 is configured to power and received data from RF devices 104, 106 (e.g., the proximity card 108) over the low frequency carrier frequency (e.g., 125 kHz).

More specifically, in the first mode of operation in which communication via the high-frequency transceiver circuit 306 is enabled, the signal-limiting circuit 310 is in the state in which the first node 320 is electrically coupled to the terminal 326, the signal-limiting circuit 312 is in the state in which the second node 322 is electrically coupled to the terminal 328, and the signal-limiting circuit 314 is in the state in which the third node 324 is decoupled from the terminal 332. In the second mode of operation in which communication via the low-frequency transceiver circuit 308 is enabled, the signal-limiting circuit 310 is in the state in which the first node 320 is electrically coupled to the terminal 330, the signal-limiting circuit 314 is in the state in which the third node 324 is electrically coupled to the terminal 332, and the signal-limiting circuit 312 is in the state in which the second node 322 is decoupled from the terminal 328.

It should be appreciated that the single element antenna 302 may be embodied as any type of antenna having a single shared conductive element suitable for performing the functions described herein and otherwise consistent with the description. For example, in the illustrative embodiment, the single element antenna 302 is embodied as a coil antenna and, in some embodiments, the single element antenna 302 may be structured such that its coils are physically positioned, partially or entirely, on the same shared plane as one another (e.g., printed on or integrated within a PCB substrate, a flex PCB, and/or another suitable substrate). In such embodiments, it should be appreciated that the portion 316 of the single element antenna 302 is embodied as first portion of coils and the portion 318 is embodied as a second portion of coils. As such, in the first mode of operation, the first portion of coils is used for transmitting and receiving wireless communication using the high-frequency transceiver circuit 306 and the second portion of coils has one or more electromagnetic characteristics of a resonant stub, which may be accounted for by the high-frequency transceiver circuit 306. In the second mode of operation, both the first portion and the second portion of coils are used for transmitting and receiving wireless communication using the low-frequency transceiver circuit 308.

Figure 6:
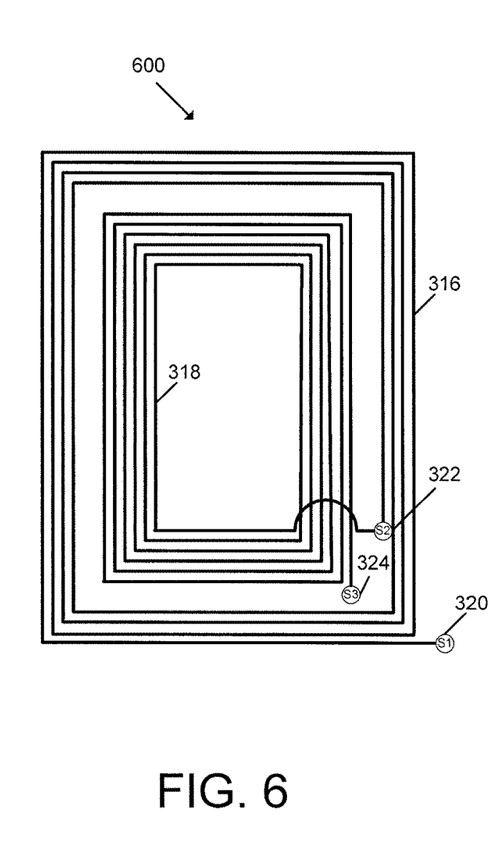
FIGS. 6-8 illustrate various embodiments of the single element antenna of FIG. 5.
Figure 7:
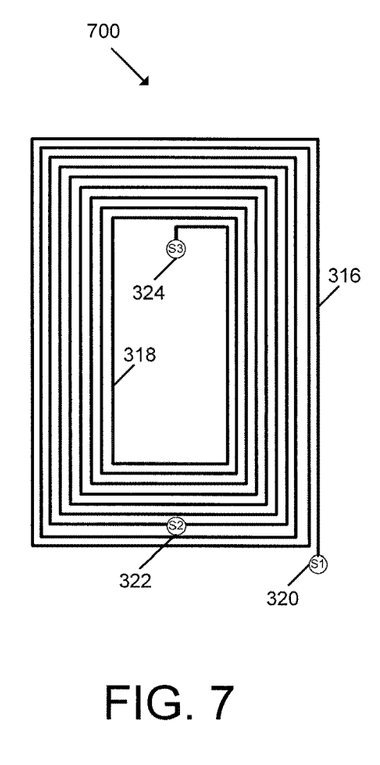
Figure 8:
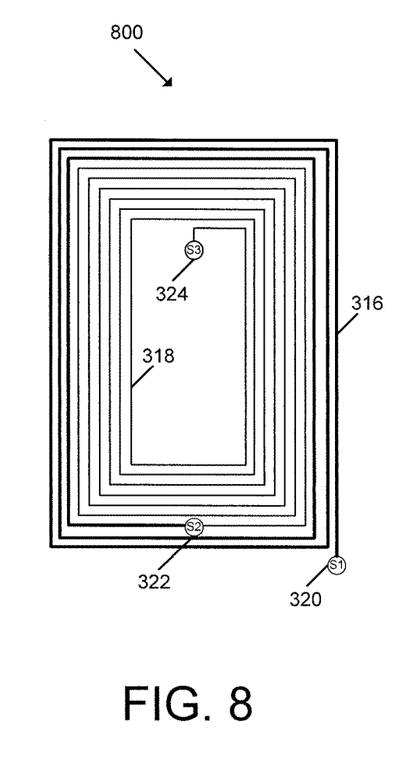

In various embodiments, the single element antenna 302 may be embodied as the single element coil antenna 600 of FIG. 6, the single element coil antenna 700 of FIG. 7, or the single element coil antenna 800 of FIG. 8. As illustrated by the illustrative antennas 600, 700, 800, it should be appreciated that each of the first portion 316 and the second portion 318 of the single element antenna 302 may include any number of conductive coils, and the diameter(s) and spacing of the coils may vary depending on the particular embodiment. For example, in some embodiments, the first coil portion 316 may be a conductive coil portion of a first diameter having a first number of windings, and the second coil portion 318 may be a conductive coil portion of a second diameter having a second number of windings. The first diameter may be the same or different from the second diameter and/or the first number may be the same or different from the second number depending on the particular embodiment. In some embodiments, in order to achieve the needed inductance for low frequency communication, the second portion of coils includes many windings (e.g., greater than one hundred windings). Further, it should be appreciated that in order to integrate the coil characteristics into a PCB, for example, the trace size, space size, layer stack, and/or antenna pattern may vary depending on the particular embodiment.

Referring back to FIG. 3, it should be appreciated that the high-frequency transceiver circuit 306 and the low-frequency transceiver circuit 308 may be embodied as any circuits suitable for performing the functions described herein. For example, in some embodiments, the high-frequency transceiver circuit 306 and/or the low-frequency transceiver circuit 308 may be embodied as or otherwise include an integrated circuit. For example, in the illustrative embodiment, the high-frequency transceiver circuit 306 may be embodied as or otherwise include a CLRC663 integrated circuit manufactured by NXP Semiconductors N.V. of Eindhoven, Netherlands. In particular, in some embodiments, the high-frequency transceiver circuit 306 may be embodied as a high-frequency transceiver circuit similar to the high-frequency transceiver circuit 900 of FIG. 9.

Figure 9:
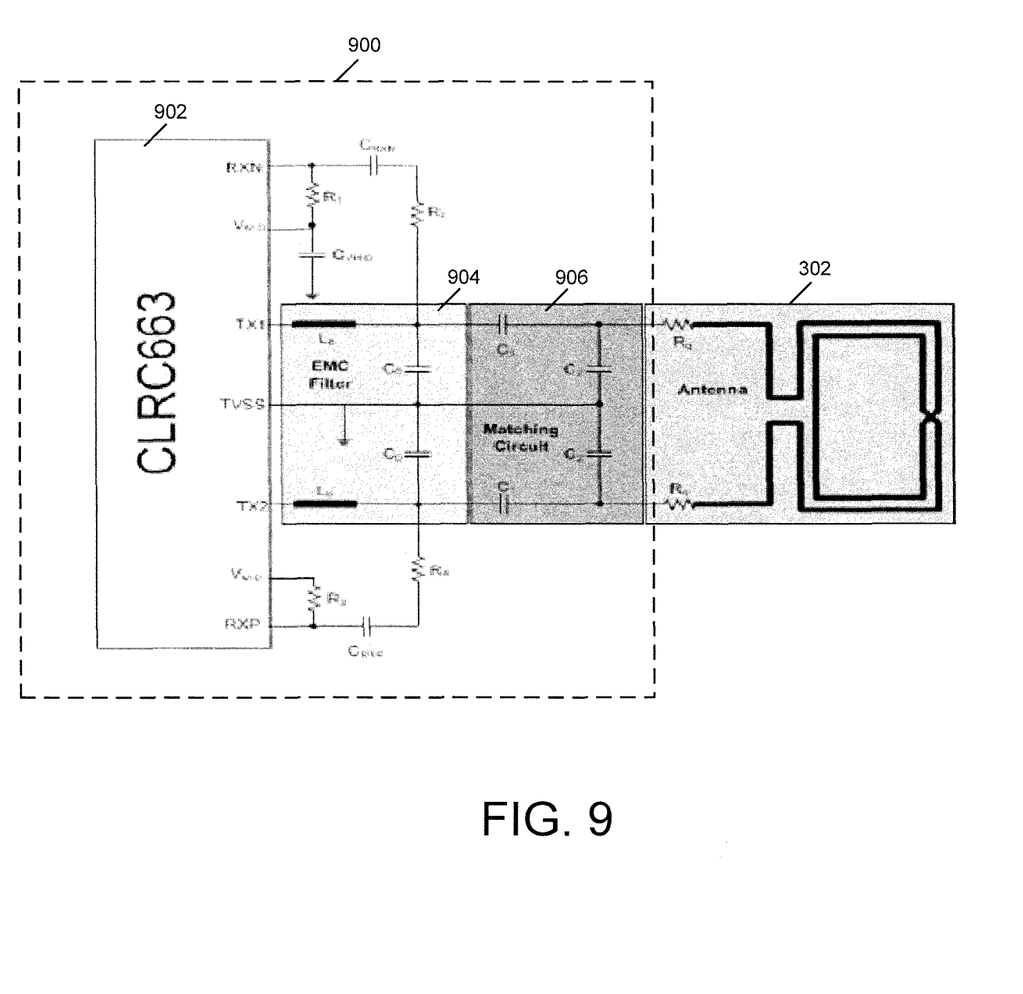
FIG. 9 is a simplified diagram of at least one embodiment of the high-frequency (HF) transceiver circuit of FIGS. 3-5.

Referring now to FIG. 9, the illustrative high-frequency transceiver circuit 900 includes a CLRC663 integrated circuit 902, an electromagnetic compatibility (EMC) filter 904, and a matching circuit 906. The CLRC663 integrated circuit 902 may perform the various processing functions described above in reference to the high-frequency transceiver circuit 306 (e.g., facilitating communication with a smartcard 110 over the high-frequency carrier frequency). Although the integrated circuit 902 is described herein as being embodied as the CLRC663 integrated circuit 902, it should be appreciated that the integrated circuit 902 may be embodied as another suitable integrated circuit or processor in other embodiments. The EMC filter 904 may reduce or eliminate the transfer of electromagnetic noise throughout and/or to/from the circuit 900. The matching circuit 906 may serve as an impedance matching circuit that functions to ensure the source and load impedances match to thereby maximize power transfer. Although the illustrative matching circuit 906 leverages capacitors to perform the matching, it should be appreciated that the matching circuit 906 may additionally or alternatively include inductors and/or other circuit elements in other embodiments. Further, it should be appreciated that the high-frequency transceiver circuit 900 may include additional or alternative components in various embodiments.

Figure 10:
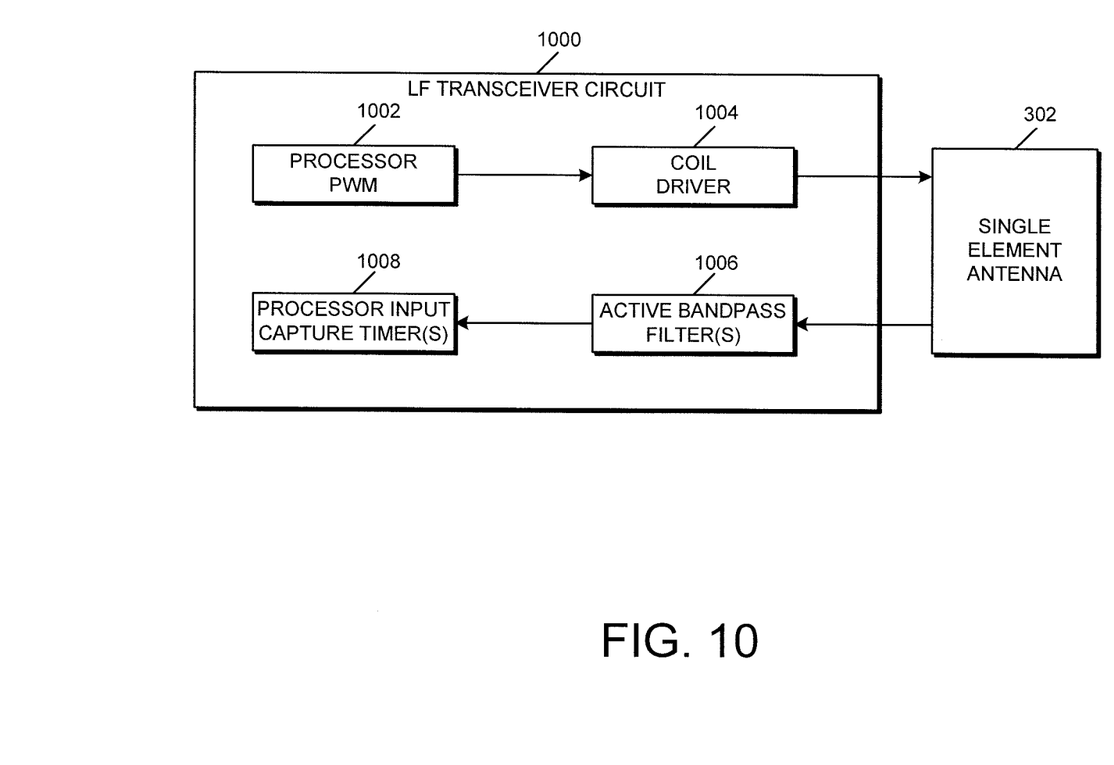
FIG. 10 is a simplified block diagram of at least one embodiment of the low-frequency (LF) transceiver circuit of FIGS. 3-5.

In some embodiments, the low-frequency transceiver circuit 308 may be embodied as a low-frequency transceiver circuit similar to the low-frequency transceiver circuit 1000 of FIG. 10. Referring now to FIG. 10, the illustrative low-frequency transceiver circuit 1000 includes a processor pulse width modulator (PWM) 1002, a coil driver 1004, one or more active bandpass filters 1006, and one or more processor input capture timers 1008. The processor PWM 1002 generates a pulse width modulated signal that is converted into a low frequency analog signal (e.g., 125 kHz) by the coil driver 1004 for transmission to the corresponding RF device 104, 106 via the single element antenna 302. Upon receiving a signal via the single element antenna 302 in the low frequency mode, the active bandpass filter(s) 1006 filters the received signal, which is passed to the processor input capture timer(s) 1008 for further processing. In order to perform the corresponding functions, it should be appreciated that the low-frequency transceiver circuit 1000 and/or components thereof may include one or more components not illustrated in FIG. 10 for simplicity. For example, in some embodiments, the coil driver 1004 may include one or more transistors (e.g., MOSFETs), inductors, and/or tuning devices (e.g., capacitors) and/or the active bandpass filter(s) 1006 may include one or more discrete components and/or operational amplifiers.

Figure 11:
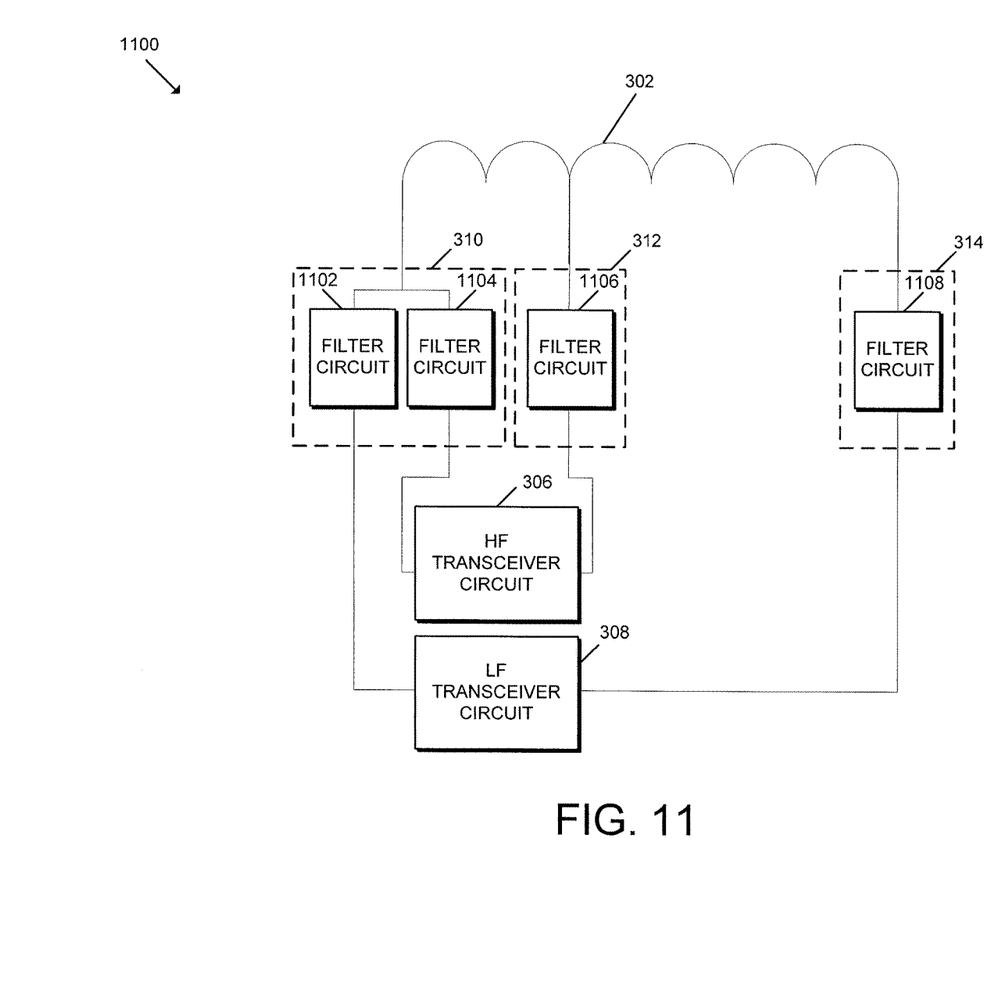
FIGS. 11 and 12 are simplified diagrams of other embodiments of the communication circuit of FIG. 1.

Referring now to FIG. 11, it should be appreciated that, in some embodiments, one or more of the signal-limiting circuits 310, 312, 314 may be embodied as, or replaced by, filter circuits. In particular, in the illustrative embodiment, the signal-limiting circuit 310 may include filter circuits 1102, 1104, the signal-limiting circuit 312 may include a filter circuit 1106, and the signal-limiting circuit 314 may include a filter circuit 1108. More specifically, the filter circuit 1102 may be electrically coupled to the first node 320 and the terminal 330 of the low-frequency transceiver circuit 308, the filter circuit 1104 may be electrically coupled to the first node 320 and the terminal 326 of the high-frequency transceiver circuit 306, the filter circuit 1106 may be electrically coupled to the second node 322 and the high-frequency transceiver circuit 306, and the filter circuit 1108 may be electrically coupled to the third node 324 and the low-frequency transceiver circuit 308. Depending on the particular embodiment, each of the filter circuits 1102, 1104, 1106, 1108 may be embodied as one or more lowpass filters, highpass filters, and/or bandpass filters configured to block/limit signals consistent with the techniques described herein. Further, each of the filter circuits 1102, 1104, 1106, 1108 may be embodied as an active or passive filter. As such, in embodiments in which each of the filter circuits 1102, 1104, 1106, 1108 is embodied as a passive filter, it should be appreciated that the control circuit 1100 may eliminate the need for logic control (e.g., by the processor 304). For example, in some embodiments, a passive filter may be embodied as a filter with a cutoff frequency such that signals are preventing from entering the high-frequency transceiver circuit 306 from the low-frequency transceiver circuit 308 and/or preventing from entering the low-frequency transceiver circuit 308 from the high-frequency transceiver circuit 306.

Figure 12:
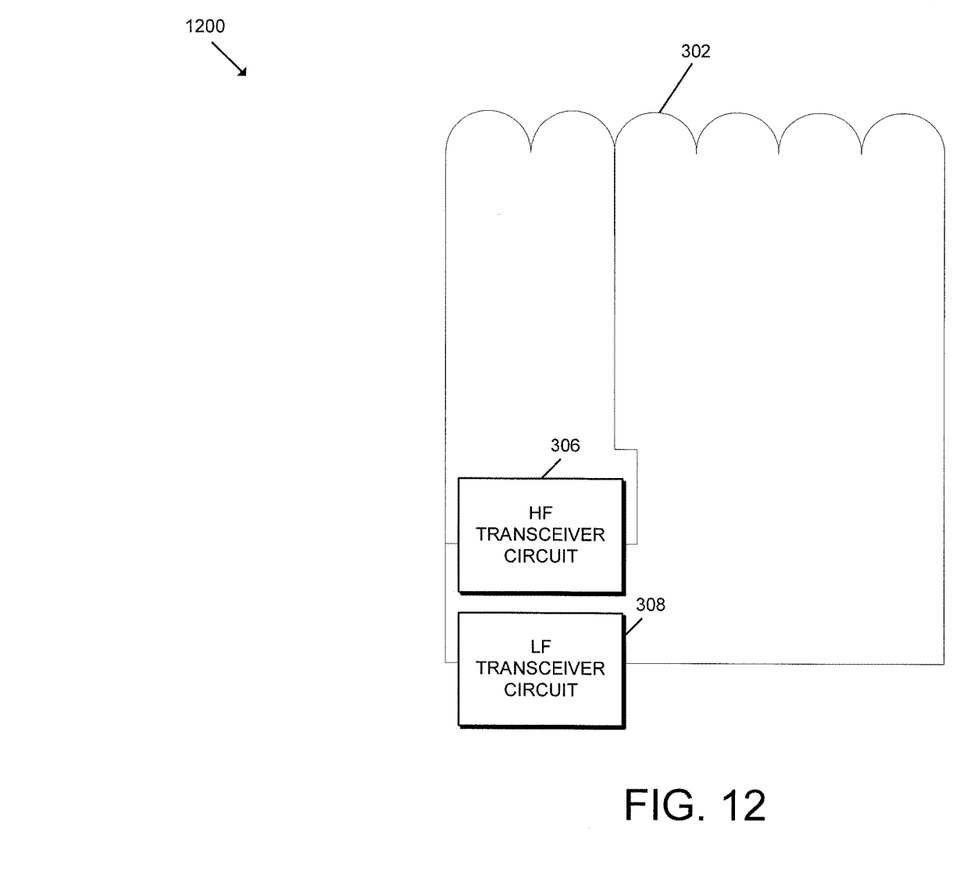

Referring now to FIG. 12, in some embodiments, the signal-limiting circuits 310, 312, 314 may be omitted from the communication circuit 1200. For example, in some embodiments, the high-frequency transceiver circuit 306 and the low-frequency transceiver circuit 308 may include high impedance modes such that additional "switching" and/or filtering are unnecessary. Accordingly, in the illustrative embodiment of FIG. 12, the high-frequency transceiver circuit 306 is electrically coupled directly to the first node 320 and the second node 322, and the low-frequency transceiver circuit 308 is electrically coupled directly to the first node 320 and the third node 324.

According to one aspect, a communication circuit may include a single element antenna, a high-frequency transceiver circuit, a low-frequency transceiver circuit, a first switch, a second switch, and a third switch. The single antenna may include a first node, a second node, and a third node, wherein a first portion of the single element antenna is defined between the first node and the second node and a second portion of the single element antenna is defined between the second node and the third node. The high-frequency transceiver circuit may have a first terminal and a second terminal, and wherein the high-frequency transceiver circuit enables wireless communication with a first transponder over a high frequency carrier frequency. The low-frequency transceiver circuit may have a third terminal and a fourth terminal, and wherein the low-frequency transceiver circuit enables wireless communication with a second transponder over a low frequency carrier frequency. The first switch electrically may be coupled to the first node and configured to be switched between a first state in which the first node is electrically coupled to the first terminal and a second state in which the first node is electrically coupled to the third terminal. The second switch may be electrically coupled to the second node and configured to be switched between an open state and a short state in which the second node is electrically coupled to the second terminal. The third switch may be electrically coupled to the third node and configured to be switched between an open state and a short state in which the third node is electrically coupled to the fourth terminal.

In some embodiments, communication over the high-frequency transceiver circuit may be enabled when the first switch is in the first state and the second switch is in the short state, and communication over the low-frequency transceiver circuit may be enabled when the first switch is in the second state and the third switch is in the short state. In some embodiments, the first portion of the single element antenna may include a first conductive coil of a first diameter and the second portion of the single element antenna may include a second conductive coil of a second diameter different from the first diameter. In some embodiments, the first portion of the single element antenna may include a first conductive coil having a first number of windings and the second portion of the single element antenna may include a second conductive coil having a second number of windings different from the first number. In some embodiments, the high-frequency transceiver circuit may account for resonant stub properties of the second portion of the single element antenna. In some embodiments, the low frequency carrier frequency is nominally 125 kHz. In some embodiments, the high frequency carrier frequency is nominally 13.56 MHz.

In some embodiments, the communication circuit may further include a control circuit configured to control the first switch, the second switch, and the third switch. Further, the control circuit may switch the first switch to the first state, the second switch to the short state, and the third switch to the open state for communication with the first transponder over the high frequency carrier frequency via the high-frequency transceiver circuit, and the control circuit may switch the first switch to the second state, the second switch to the open state, and the third switch to the short state for communication with the second transponder over the low frequency carrier frequency via the low-frequency transceiver circuit. In some embodiments, the control circuit includes a microcontroller. In some embodiments, the low-frequency transceiver circuit may be disconnected from the single element antenna during communication over the high frequency carrier frequency, and the high-frequency transceiver circuit may be disconnected from the single element antenna during communication over the low frequency carrier frequency. In some embodiments, each of the first switch, the second switch, and the third switch comprises one of a relay, a transistor, or a solid state relay.

According to another aspect, a communication circuit may include a single element antenna, a plurality of signal-limiting circuits, a high-frequency transceiver circuit, and a low-frequency transceiver circuit. The high-frequency transceiver circuit may be adapted to be selectively coupled to the single element antenna via the plurality of signal-limiting circuits and tuned to operate at a high frequency carrier frequency, and the low-frequency transceiver circuit may be adapted to be selectively coupled to the single element antenna via the plurality of signal-limiting circuits and tuned to operate at a low frequency carrier frequency.

In some embodiments, the communication circuit may further include a processor and a memory comprising a plurality of instructions stored thereon that, in response to execution by the processor, causes the communication circuit to control the plurality of signal-limiting circuits to couple the high-frequency transceiver circuit to the single element antenna and decouple the low-frequency transceiver circuit from the single element antenna for communication at the high frequency carrier frequency during a first mode of operation, and control the plurality of signal-limiting circuits to couple the low-frequency transceiver circuit to the single element antenna and decouple the high-frequency transceiver circuit from the single element antenna for communication at the low frequency carrier frequency during a second mode of operation.

In some embodiments, the single element antenna may include a resonant stub when the high-frequency transceiver circuit is coupled to the single element antenna and the low-frequency transceiver circuit is decoupled from the single element antenna, and the high-frequency transceiver circuit may filter one or more electromagnetic characteristics of the resonant stub. In some embodiments, the communication circuit may be configured to power and receive data from a smartcard during the first mode of operation. In some embodiments, the communication circuit may be configured to power and receive data from a proximity card during the second mode of operation. In some embodiments, the low frequency carrier frequency is nominally 125 kHz. In some embodiments, the high frequency carrier frequency is nominally 13.56 MHz.

According to yet another aspect, a communication circuit for multi-frequency communication may include a single element antenna, a high-frequency transceiver circuit, and a low-frequency transceiver circuit. The single element antenna may include a plurality of coils, wherein the plurality of coils consists of a first portion of coils and a second portion of coils. The high-frequency transceiver circuit may be adapted to be selectively coupled to the single element antenna in a first mode of operation of the communication circuit in which wireless communication with a first RF communication device at a high frequency carrier frequency via the single element antenna is enabled. The low-frequency transceiver circuit may be adapted to be selectively coupled to the single element antenna in a second mode of operation of the communication circuit in which wireless communication with a second RF communication device at a low frequency carrier frequency via the single element antenna is enabled. In the first mode of operation, the first portion of coils may be used for transmitting and receiving the wireless communication with the first RF communication device and the second portion of coils may have one or more electromagnetic characteristics of a resonant stub. In the second mode of operation, the first portion of coils and the second portion of coils may be used for transmitting and receiving the wireless communication with the second RF communication device. In some embodiments, the high-frequency transceiver circuit may enable wireless communication with a smartcard at a nominal carrier frequency of 13.56 MHz, and the low-frequency transceiver circuit may enable wireless communication with a proximity card at a nominal carrier frequency of 125 kHz.

What is claimed is:

1. A communication circuit, comprising:
   a single element antenna including a first node, a second node, and a third node, wherein a first portion of the single element antenna is defined between the first node and the second node and a second portion of the single element antenna is defined between the second node and the third node;
   a high-frequency transceiver circuit having a first terminal and a second terminal, and wherein the high-frequency transceiver circuit enables wireless communication with a first transponder over a high frequency carrier frequency;
   a low-frequency transceiver circuit having a third terminal and a fourth terminal, and wherein the low-frequency transceiver circuit enables wireless communication with a second transponder over a low frequency carrier frequency;
   a first switch electrically coupled to the first node and configured to be switched between a first state in which the first node is electrically coupled to the first terminal and a second state in which the first node is electrically coupled to the third terminal;
   a second switch electrically coupled to the second node and configured to be switched between an open state and a short state in which the second node is electrically coupled to the second terminal; and
   a third switch electrically coupled to the third node and configured to be switched between an open state and a short state in which the third node is electrically coupled to the fourth terminal.

2. The communication circuit of claim 1, wherein communication over the high-frequency transceiver circuit is enabled when the first switch is in the first state and the second switch is in the short state; and
   wherein communication over the low-frequency transceiver circuit is enabled when the first switch is in the second state and the third switch is in the short state.

3. The communication circuit of claim 1, wherein the first portion of the single element antenna comprises a first conductive coil of a first diameter and the second portion of the single element antenna comprises a second conductive coil of a second diameter different from the first diameter.

4. The communication circuit of claim 1, wherein the first portion of the single element antenna comprises a first conductive coil having a first number of windings and the second portion of the single element antenna comprises a second conductive coil having a second number of windings different from the first number.

5. The communication circuit of claim 1, wherein the high-frequency transceiver circuit accounts for resonant stub properties of the second portion of the single element antenna.

6. The communication circuit of claim 1, wherein the low frequency carrier frequency is nominally 125 kHz.

7. The communication circuit of claim 1, wherein the high frequency carrier frequency is nominally 13.56 MHz.

8. The communication circuit of claim 1, further comprising a control circuit configured to control the first switch, the second switch, and the third switch;

wherein the control circuit switches the first switch to the first state, the second switch to the short state, and the third switch to the open state for communication with the first transponder over the high frequency carrier frequency via the high-frequency transceiver circuit; and wherein the control circuit switches the first switch to the second state, the second switch to the open state, and the third switch to the short state for communication with the second transponder over the low frequency carrier frequency via the low-frequency transceiver circuit.

9. The communication circuit of claim 8, wherein the control circuit comprises a microcontroller.

10. The communication circuit of claim 8, wherein the low-frequency transceiver circuit is disconnected from the single element antenna during communication over the high frequency carrier frequency; and wherein the high-frequency transceiver circuit is disconnected from the single element antenna during communication over the low frequency carrier frequency.

11. The communication circuit of claim 1, wherein each of the first switch, the second switch, and the third switch comprises one of a relay, a transistor, or a solid state relay.

* * * * *